(12) United States Patent
Erol et al.

(10) Patent No.: US 10,979,471 B2
(45) Date of Patent: Apr. 13, 2021

(54) SURVEILLANCE SYSTEMS AND METHODS FOR AUTOMATIC REAL-TIME MONITORING

(71) Applicants: Berat Alper Erol, San Antonio, TX (US); Abhijit Majumdar, San Antonio, TX (US); Patrick Benavidez, San Antonio, TX (US); Divya Bhaskaran, San Antonio, TX (US); Mohammad Jamshidi, San Antonio, TX (US); Benjamin Factor, San Antonio, TX (US); Arman Rezakhani, San Antonio, TX (US)

(72) Inventors: Berat Alper Erol, San Antonio, TX (US); Abhijit Majumdar, San Antonio, TX (US); Patrick Benavidez, San Antonio, TX (US); Divya Bhaskaran, San Antonio, TX (US); Mohammad Jamshidi, San Antonio, TX (US); Benjamin Factor, San Antonio, TX (US); Arman Rezakhani, San Antonio, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 16/577,221

(22) Filed: Sep. 20, 2019

(65) Prior Publication Data
US 2020/0099892 A1 Mar. 26, 2020

Related U.S. Application Data

(60) Provisional application No. 62/733,863, filed on Sep. 20, 2018.

(51) Int. Cl.
*G06K 9/00* (2006.01)
*H04L 29/06* (2006.01)
(Continued)

(52) U.S. Cl.
CPC ........ *H04L 65/605* (2013.01); *H04L 47/2416* (2013.01); *H04L 49/206* (2013.01);
(Continued)

(58) Field of Classification Search
CPC ... H04L 47/22; H04L 47/2416; H04L 49/206; H04L 65/4069; H04L 65/80;
(Continued)

(56) References Cited

U.S. PATENT DOCUMENTS

2018/0012463 A1* 1/2018 Chaudhry .............. H04N 7/181
2018/0096576 A1* 4/2018 Anderholm ........... G01S 13/867
(Continued)

OTHER PUBLICATIONS

J. Redmon, S. Divvala, R. Girsh1ck, and A. Farhadi, "You only look once: Unified, real-time obJect detection," in Proceedings of the IEEE Conference on Computer Vision and Pattern Recognition, 2016. pp. 779-788.
(Continued)

*Primary Examiner* — John R Schnurr
(74) *Attorney, Agent, or Firm* — Thomas | Horstemeyer, LLP

(57) ABSTRACT

The present disclosure describes various embodiments of surveillance systems and methods. In one such embodiment, an exemplary surveillance system includes at least one video camera configured to capture video data of a surveilled area; and a computing device that stores a surveillance program. An exemplary surveillance program includes computer-executable instructions configured to: analyze the video data captured by the at least one video camera; identify objects that enter the surveilled area and log a time at which the objects entered the surveilled area; determine an object type for each object; track the identified objects to determine a period of time the objects have been present within the surveilled area; and generate and transmit an alert for each identified object that has been present within the surveilled
(Continued)

area for a period of time that exceeds a predetermined time threshold.

20 Claims, 3 Drawing Sheets

(51) Int. Cl.
   *H04L 12/853* (2013.01)
   *H04L 12/931* (2013.01)
   *H04N 5/77* (2006.01)

(52) U.S. Cl.
   CPC ...... *H04L 65/4069* (2013.01); *H04L 65/4076* (2013.01); *H04L 65/80* (2013.01); *H04N 5/77* (2013.01)

(58) Field of Classification Search
   CPC ........... G06K 9/00718; G06K 9/00771; G06K 9/6201; G08B 13/196; H04N 5/77; H04N 7/18
   See application file for complete search history.

(56) References Cited

U.S. PATENT DOCUMENTS

| | | | | |
|---|---|---|---|---|
| 2018/0101732 | A1* | 4/2018 | Uchiyama | G06K 9/00771 |
| 2018/0349684 | A1* | 12/2018 | Bapat | G06K 9/00295 |
| 2019/0197847 | A1* | 6/2019 | Hirakawa | G08B 13/19652 |
| 2019/0347518 | A1* | 11/2019 | Shrestha | G06K 9/00362 |

OTHER PUBLICATIONS

W. Liu, D. Anguelov, D. Erhan. C. Szegedy, S. Reed, C.-Y. Fu. and A C Berg, "Ssd Single shot multibox detector," in European conference on computer vision. Springer, 2016, pp. 21-37.
N. Wojke. A. Bewley. and D. Paulus. "Simple online and realtime tracking with a deep association metric," CoRR, vol. abs/1703. 07402, 2017. [Online]. Available: http://arxiv.org/abs/1703.07 402.
Z. Cao. T. Simon. S.-E. Wei, and Y. Sheikh. "Realtime multi-person 2d pose estimation using part affinity fields," in IEEE Conference on Computer Vision and Pattern Recognition (CVPR), 2017.
B. Ummenhofer and H. Zhou and J. Uhrig and N. Mayer and E. Ilg and A. Dosovitskiy and T. Brox, "DeMoN: Depth and Motion Network for Learning Monocular Stereo," in IEEE Conference on Computer Vision and Pattern Recognition (CVPR), 2017.

* cited by examiner

SURVEILLANCE SYSTEMS AND METHODS FOR AUTOMATIC REAL-TIME MONITORING

CROSS-REFERENCE TO RELATED APPLICATION

This application claims priority to U.S. provisional application entitled, "Surveillance Systems and Methods for Automatic Real-Time Monitoring," having Ser. No. 62/733,836, filed Sep. 20, 2018, which is entirely incorporated herein by reference.

BACKGROUND

Video surveillance is often used in both public and private areas as a security measure. One form of video surveillance is passive video surveillance in which video of the surveilled area is continuously captured by one or more cameras. If a security breach occurs, such as a break-in, the video data can be reviewed after the breach in an effort to determine who caused the breach. While such a determination can be valuable in terms of identifying wrongdoers, passive video surveillance does little to prevent such breaches from occurring in the first place. In addition, passive video surveillance can result in the recording of many hours of useless video data, which is time consuming to review if and when a need for such review arises. Moreover, substantial storage capacity is required when there are multiple cameras that continuously record video data. If such storage space is limited, the video data may be captured at a slow frame rate, in which case the video data may be of low quality and, therefore, little value.

Another form of video surveillance is active video surveillance in which one or more security personnel review video of the surveilled area in real time. While such surveillance can be used to prevent or interrupt a security breach, it requires active participation by one or more security professionals. This is unattractive for several reasons. First, such security professionals typically must be paid to monitor the captured video. This can be expensive, especially when multiple security professionals are required. Second, it is possible for such persons to miss potential security threats, especially when one or more individuals are responsible for monitoring multiple video feeds. In addition, human beings can be easily distracted and their ability to closely monitor video feeds can be significantly hindered by human factors such as fatigue or boredom.

While some automated surveillance systems have been developed, many such systems rely on movement for identifying a potential threat. Accordingly, if a potential wrongdoer stops moving, he or she can become invisible to the surveillance system, which creates a vulnerability.

In view of the above discussion, it can be appreciated that it would be desirable to have an effective surveillance system and method that is capable of automatically monitoring an area in real time for security threats.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

Figure 1:
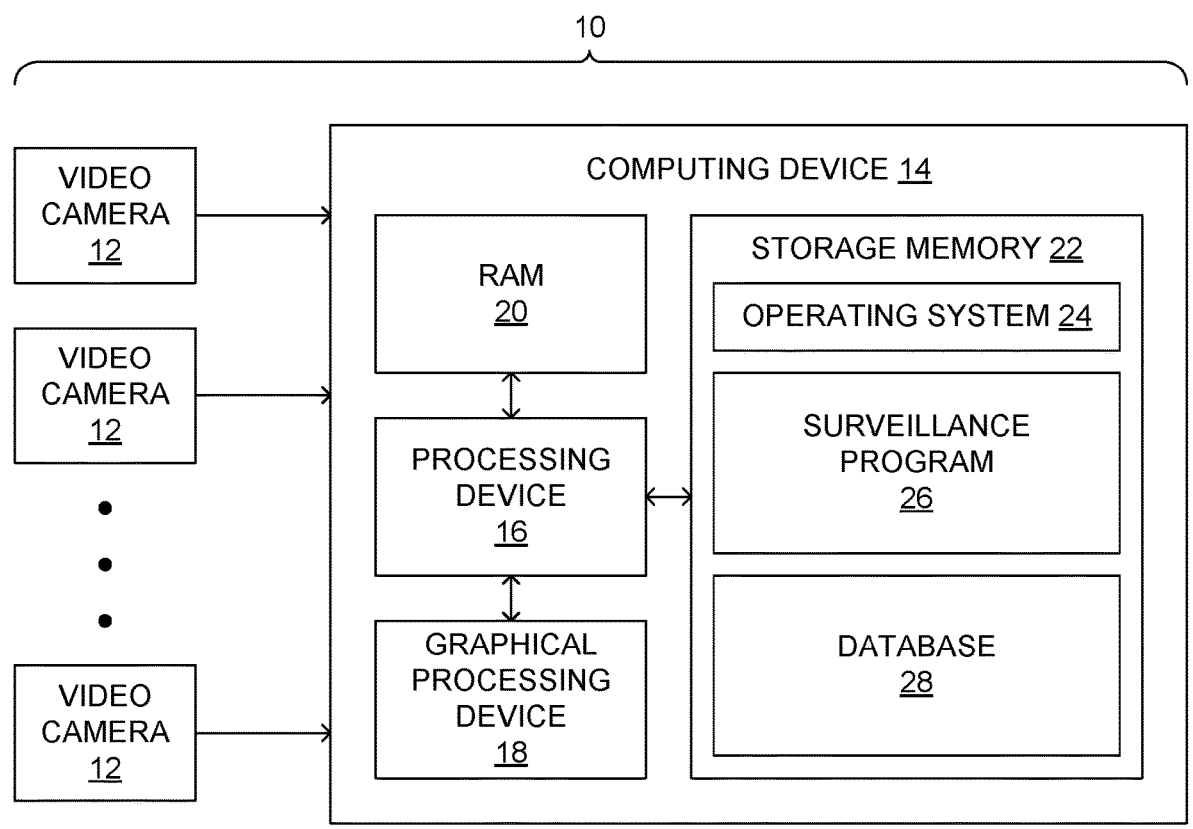
FIG. 1 is a block diagram of an embodiment of a surveillance system for automatic real-time monitoring of an area.

As described above, it would be desirable to have an effective surveillance system and method that is capable of automatically monitoring an area in real time for security threats. Disclosed herein are examples of such systems and methods. In one embodiment, a system comprises one or more video cameras and a computing device that executes a surveillance program that is configured to analyze the video data captured by the cameras to identify both animate and inanimate objects that enter the surveilled area and to track the duration of time the objects spend within the surveilled area. If it is determined that an object is a dangerous object that poses an imminent threat (e.g., a weapon) or that an object remains within the surveilled area for an unusually long period of time, which may also be indicative of a security threat, one or more alerts can be generated and transmitted to relevant parties to notify them of the situation. In some embodiments, the surveillance system can also be configured to generate and transmit alerts when it is determined that a person within the surveilled area is exhibiting unusual behavior.

In the following disclosure, various specific embodiments are described. It is to be understood that those embodiments are example implementations of the disclosed inventions and that alternative embodiments are possible. All such embodiments are intended to fall within the scope of this disclosure.

The disclosed systems and methods are intended to overcome the limitations of current video surveillance. With the disclosed systems and methods, objects, including both animate and inanimate objects that enter a surveilled area are identified and tracked to determine the amount of time the objects are present within the surveilled area. This enables the system to determine, as to each object, if the object has been in the surveilled area for a period of time that, based upon statistical data, exceeds the amount of time that type of object typically spends within such an area. If an object is present within the surveilled area for longer than that amount of time, this may be indicative of a potential security threat or another problem that should be addressed. In such cases, one or more alerts can be generated to notify the persons who should be made aware of the situation. In addition, steps can be taken to ensure video data of the object is preserved for later review. In cases in which video data is continually captured and overwritten by the surveillance system, so as to avoid having to store numerous hours of useless video footage, the video data of the tracked object can be stored in a manner in which it will not be overwritten.

In some embodiments, the systems and methods can further be used to track and record the trajectories of objects within the surveilled area. Such information can be useful for other purposes, such as determining the best location for an advertisement or pamphlet.

In some embodiments, the systems and methods additionally can be used to monitor the behavior of persons within the surveilled area to detect physical or mental health issues. For example, if it is determined that an individual is lying down on the ground within the surveilled area, such a person may require medical attention and one or more alerts can be generated to notify appropriate persons.

As can be appreciated from the above discussion, the disclosed systems and methods operate in real time and enable the prevention or interruption of a security breach, as opposed to merely recording such a breach for later review as with passive surveillance systems. Furthermore, the disclosed systems and methods operate automatically such that there is no need for security personnel to monitor the video in real time as in the case of conventional active video surveillance systems.

FIG. 1 is a block diagram of an embodiment of a surveillance system 10 for automatic real-time monitoring of an area. It is noted that such a surveillance system 10 can be implemented in a public or private area and can be operated by a professional security company, a place of business, or a home owner. Indeed, the surveillance system 10 can be used in substantially any context in which automatic real-time monitoring of an area is desired.

As shown in FIG. 1, the surveillance system 10 generally includes one or more video cameras 12 and a computing device 14 that is in electrical communication with the camera. The video camera 12 can, for example, comprise a digital video camera that sequentially captures individual digital images or frames at a high rate of speed (e.g., ≥30 fps). In some embodiments, the video cameras 12 comprise stereoscopic video cameras having two lenses separated by a known distance. The video cameras 12 can be mounted to appropriate mounting surfaces, such as a wall or ceiling, and the lenses of the cameras can be directed toward the area that is to be surveilled. Optionally, the video camera 12 can be protected by a suitable enclosure that prevents tampering. In some embodiments, the video cameras 12 are fixed cameras. In other embodiments, the video cameras 12 are configured to pan and tilt such that they can sweep back and forth across the surveilled area and/or actively track a given object within its field of view.

The computing device 14 is configured to receive the video data captured by the video cameras 12 either through a wired or wireless connection. In some embodiments, the computing device 14 comprises a desktop, notebook, or server computer. Irrespective of its particular configuration, the computing device 14 can include a processing device 16 such as a central processing unit (CPU), a graphical processing device 18 such as a graphical processing unit (GPU), random access memory (RAM) 20, and storage memory 22. Stored within the storage memory 22, a non-transitory computer-readable medium, is an operating system 24 and a surveillance program 26 comprising computer-executable instructions (e.g., comprised by one or more algorithms) configured to analyze the video data captured by the video camera 12. As described below in greater detail in relation to the example of FIG. 2A and FIG. 2B, the surveillance program 26 is, in some embodiments, configured to analyze each frame of the received video data to identify any new objects that have entered the surveilled area and to track any previously identified objects within the surveilled area. In addition, the surveillance program 26 is configured to determine, as to each identified object, the amount of time the object has been present within the surveilled area. Whenever an identified object has been present within the area for a period of time that exceeds a given threshold, an alert can be generated by the surveillance program 26 to notify appropriate persons of that occurrence. The storage memory 22 further comprises a database 28, which can store information about objects that could appear in the surveilled area and, therefore, can be used as reference in identifying objects.

Figure 2A:
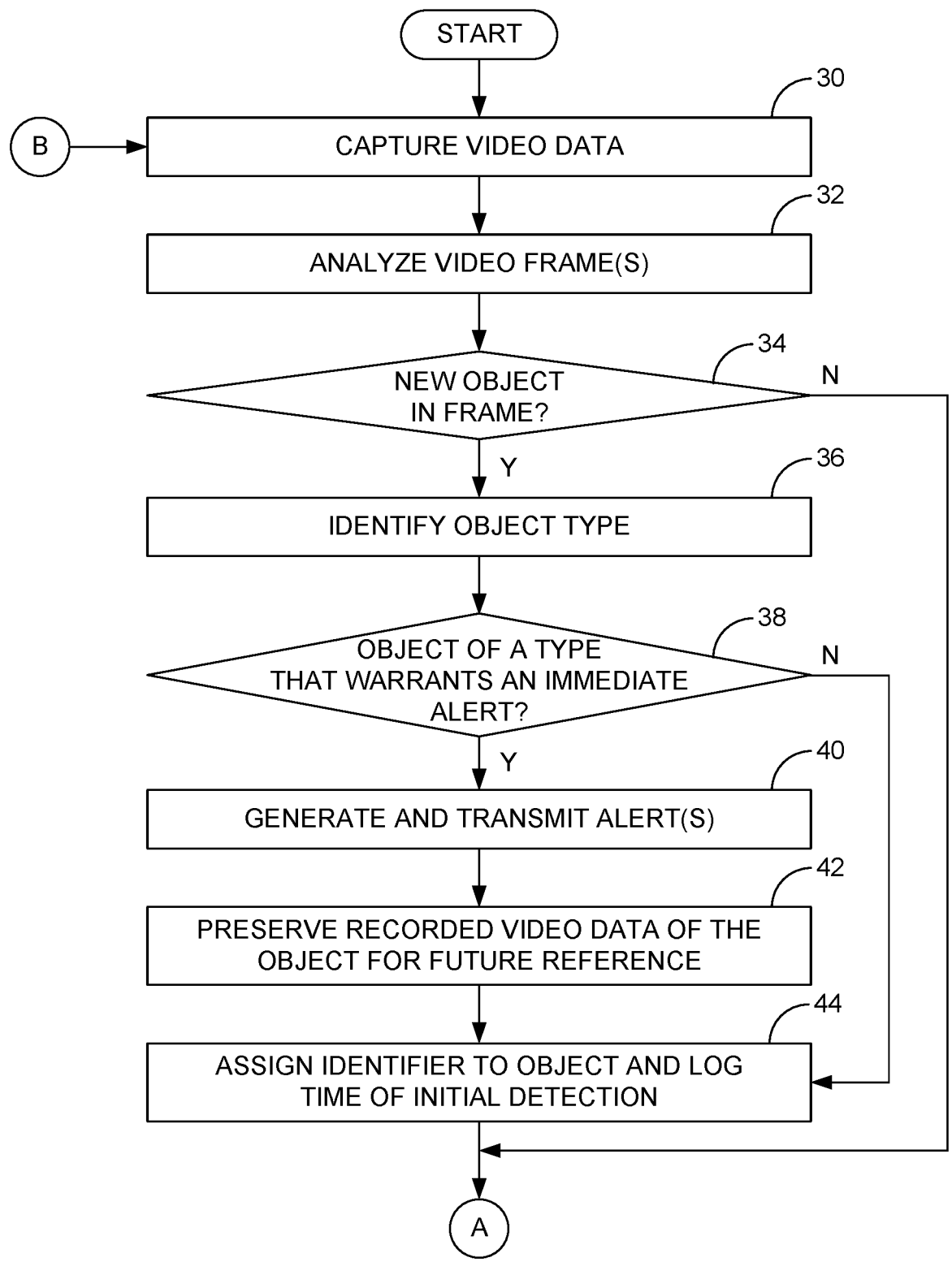
FIG. 2A and FIG. 2B together provide a flow diagram of an embodiment of a method for performing automatic real-time surveillance on an area.
Figure 2B:
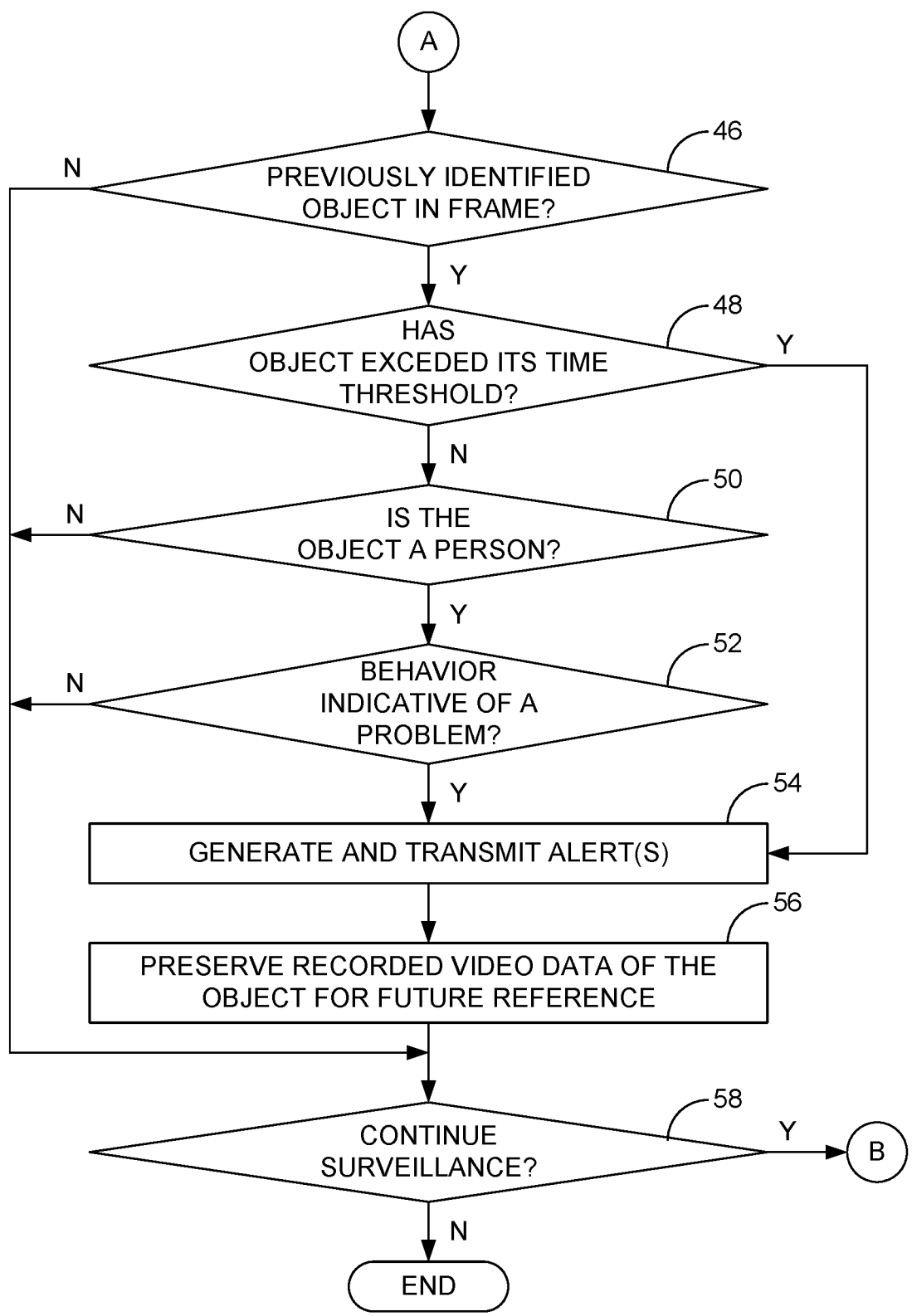

FIGS. 2A and 2B together present a flow diagram of an example method for performing automatic real-time surveillance on an area. While the embodiment of FIGS. 2A and 2B identifies specific actions performed in a particular order, it is to be understood that alternative modes of operation are possible.

Beginning with block 30 of FIG. 2A, video data is captured with one or more video cameras, such as video cameras 12. This video data is shared with a computing device, such as computing device 14, in real time so that potential security threats and/or other occurrences that warrant action can be immediately identified to relevant parties. As the video data is received, the various frames of the video data can be analyzed, as indicated in block 32. In some embodiments, each individual frame of the video data is independently analyzed, for example using the surveillance program 26. As will be understood from the discussion that follows, the analysis that is performed can take various forms. By way of example, the analysis can include detecting new objects that come into field of view of the video camera, identifying the new objects in terms of their respective types, tracking the time periods the objects are within the surveilled area, determining the orientations and positions (i.e., poses) of the objects, as well as other forms of analysis.

For example, in one embodiment, a frame from the video is first passed through a deep learning based multi-object detector, which is customized to identify objects of interest (e.g., people, bags, pets, arms, etc.). These detected objects are used to trigger events in the surveillance system which include the start of recording video and the start of tracking objects within the video.

Accordingly, referring to decision block 34, as the frames of video data are analyzed, it is determined whether or not a new object is detected. Such "new" objects, are objects that were not previously detected or identified by the surveillance system, meaning that the object has just entered the surveilled area. If no new object is detected, flow continues down to block 44 described below. If a new object is detected, however, flow continues to block 36 at which the object type is identified. The "type" of object refers to the category or classification of the object, whether it be an animate or inanimate object. Example object types include weapons, human beings, animals, handbags, backpacks, or any other type of object that reasonably could appear in the surveilled area and that would potentially be of interest. This type identification can be performed in various ways. For example, the type identification can be performed by image matching in relation to images and/or models of objects stored within a database, such as the database 28. In some embodiments, the image matching can be facilitated by using a deep learning-based multi-object detector that is customized to identify objects of interest.

In one embodiment, such tracking is done using feature matching and custom logic based algorithms to avoid loss of tracking while occlusion, misdetection, loss of detection, and other anomalies occur. Ambiguities in tracking and identification can also be removed using depth information obtained by computing a disparity or depth map from the particular configuration (e.g., monocular or stereoscopic) of the camera(s). A depth map indicates how far each observed object is from the camera, and hence can provide another dimension to distinguish the tracked objects.

Once the object type has been identified, flow continues to decision block 38 at which it is determined whether or not one or more newly identified objects are dangerous objects that warrant an immediate alert. Such object types are those that pose an imminent threat to items or persons within the surveilled area. Examples of dangerous objects are weapons (e.g., guns, knives, etc.) as well as objects that could be used to cause destruction to the surveilled facilities (e.g., hammers, drills, saws, etc.). When such an object is identified, flow continues to block 40 at which one or more alerts are generated and transmitted. As noted above, such alerts can be sent to relevant parties. Who these relevant parties are can depend upon the area that is being surveilled as well as the nature of the object that has been identified. For example, if the surveilled area is a bank vestibule that contains one or more automated teller machines (ATMs), the parties that are alerted may include local law enforcement, a security company employed by the bank, and members of bank management. If, on the other hand, the surveilled area is a private home, the parties that are alerted may include a security company employed by the homeowner as well as the homeowner.

The nature of the alert can also vary and, in some embodiments, can be selected by the system user. As examples, the alerts can be in the form of one or more electronic messages electronic sent to one or more computers, tablets, or smart phones. In some embodiments, the alert can also include a visual and/or audible alert provided to persons on the premises (e.g., bank tellers). Irrespective of the form of the alert and to whom it is transmitted, the alert warns the relevant entities of a problem so that those entities can take action in an effort to avoid an undesired consequence. In some embodiments, the alerts can include relevant information as to the problem. For example, the alert can identify the type of object that has been detected, when the object was detected, where within the surveilled area the object was detected, and any other information that may be useful to the recipient.

In addition to generating and transmitting one or more alerts in response to identifying an object that warrants such alerts, the surveillance system can also take steps to preserve video of the object for future reference, as indicated in block 42. In some embodiments, the surveillance system can be configured to store all captured video data and then overwrite the video data on a predetermined periodic basis. For instance, the system can be configured to overwrite video data that is greater than one hour old. In such a case, the system will only store an hour of video data at any given time. This avoids the accumulation of numerous hours of useless video. If an object or event is detected that warrants preservation of video of the object/event, however, the system can save the video data pertaining to that object/event so that it is preserved and is available for later review. The video data can be stored on a local machine (e.g., computing device 14) and/or a remote machine (e.g., server computer connected to the computing device 14 via an Internet connection). In embodiments in which such a store/overwrite scheme is not used, the surveillance system can be configured to begin storing video data once the object/event is detected.

Referring next to block 44, regardless of whether or not an immediate alert was sent, a unique identifier is assigned to the object and the time at which the object newly appeared is logged. These steps enable the surveillance system to track the new object and determine how long it spends in the surveilled area.

With reference next to decision block 46 of FIG. 2B, it is then determined whether or not there is a previously identified object within the surveilled area. Such "previously identified" objects are those that were previously detected, identified, and assigned an identifier in the manner described above. These objects can be tracked using, for example, feature matching. Any ambiguity in such tracking can be removed using depth information obtained by computing the disparity map from the particular configuration (monocular or stereoscopic) of the video cameras.

If no previously identified object is detected, flow continues down to decision block 58 at which it is determined whether or not surveillance should continue. If so, flow returns to block 30 of FIG. 2A and the above-described process is performed on the next video frame. If a previously identified object is in the surveilled area, however, flow continues to decision block 48 at which it is determined whether or not the object (or objects if there are multiple previously identified objects in the area) has exceeded a time threshold for that particular type of object. In some embodiments, such a time threshold is established for and stored in relation to each type of object contained in the database. The durations for the time thresholds can be selected based upon the amount of time that is considered to be typical for a given type of object to stay within the surveilled area, as determined from statistical data. For example, if a person typically spends no more than 10 minutes within the surveilled area (e.g., bank vestibule), the time threshold may be set to sometime beyond 10 minutes, such as 11 minutes, 15 minutes, etc. In a case in which the object exceeds the time threshold, it may be inferred that the object poses a security threat or that there is another problem, such as a person experiencing a health issue. Therefore, when the time threshold is exceeded for a given object, as determined by its type and the time the object was first detected by the system, flow continues down to block 54 at which one or more alerts are generated and transmitted, in similar manner the alert generation/transmission described in relation to block 40 of FIG. 2A. In addition, as indicated in block 56, steps can be performed to preserve video data of the object in similar manner to the preservation steps described in relation to block 42 of FIG. 2A.

There can be other circumstances in which one or more alerts should be transmitted. For example, if the object is a person who has not exceed the time threshold but is behaving in a manner that is indicative of a potential problem, such as a security threat or a health issue, it makes sense to transmit alerts in that situation also. Accordingly, if the object has not exceeded the time threshold, but is a person (decision block 50), flow continues to decision block 52 at which it is determined whether or not the person is behaving in a manner indicative of a problem. This determination can be made in various ways. For example, if a detected pose (i.e., orientation and position) of the person indicates that the person is lying down, and the surveilled area is one in which it is unusual for a person to lie down, the person may be experiencing a physical or a mental health problem. In such a case, one or more alerts can be transmitted. As another example, if the person is moving in an erratic manner that may be indicative of a physical or mental problem, alerts may also be justified.

Regardless of whether alerts are or are not transmitted in relation to previously identified objects, flow continues to decision block 58 at which it is determined whether or not to continue surveillance. Assuming it is desired to continue surveillance, flow returns to block 30 of FIG. 2A and the process continues with respect to the next captured video frame.

It is noted that other forms of surveillance and monitoring can be performed, if desired. For example, in addition to tracking the durations each object spends within the surveilled area, the trajectories and movement of the objects can be tracked.

In addition, it is noted that, when the surveillance system comprises multiple cameras, objects can be tracked as they move between the fields of view of the various cameras such that the video data collected by the cameras is coordinated. Therefore, if an object is first detected and identified by a first camera, the object will not be considered to be a new object if the object moves out of the field of view of the first camera and into the field of view of a second camera. Accordingly, the duration of time the object spends in the surveilled area is tracked, as opposed to the duration of time the object spends within the field of view of any given camera.

It is further noted that, in some embodiments, multiple alerts can be transmitted to the same entities for the same object. For example, a first alert can be transmitted when a person initially exceeds his or her time threshold within the surveilled area. As exceeding the time threshold by a small duration of time may not necessarily indicate a problem, the recipient of the alert may choose not take any action upon receiving the first alert. If, however, the person remains in the surveilled area for a more significant period of time beyond the threshold, a second alert can be transmitted to notify the relevant party of this fact. Such a second alert can, for example, be more emphatic than the first alert as the surveilled person's decision to remain in the surveilled area may be more suspect as time passes.

Certain embodiments of the present disclosure can be implemented in hardware, software, firmware, or a combination thereof. In one embodiment, the surveillance program 26 is implemented in software or firmware that is stored in a memory and that is executed by a suitable instruction execution system. If implemented in hardware, as in an alternative embodiment, logic of the surveillance program 26 can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow diagrams or charts should be understood as representing modules, segments, or portions of code which include one or more executable instructions for implementing specific logical functions or steps in the process, and alternate implementations are included within the scope of embodiments of the present disclosure in which functions may be executed out of order from that shown or discussed, including substantially concurrently or in reverse order, depending on the functionality involved, as would be understood by those reasonably skilled in the art of the present disclosure.

In one embodiment, the surveillance program 26 comprises an ordered listing of executable instructions for implementing logical functions that can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical).

It should be emphasized that the above-described embodiments of the present disclosure are merely possible examples of implementations, merely set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A surveillance system comprising:
a plurality of video cameras configured to capture video data of a surveilled area, wherein a field of view of each of the plurality of video cameras corresponds to a portion of the surveilled area, wherein the field of view of each of the plurality of video cameras does not include all of the surveilled area, wherein a plurality of field of views of the plurality of video cameras covers an entirety of the surveilled area; and
a computing device that stores a surveillance program including computer-executable instructions configured to:
analyze the video data captured by the plurality of video cameras;
identify an object that enters the surveilled area and log a time at which the object entered the surveilled area by tracking the object as the object moves out of the field of view of a first video camera and into the field of a view of a second video camera, wherein the plurality of video cameras comprises the first video camera and the second video camera;
determine an object type for the object based on at least image matching in relation to an image database;
track the identified object to determine a period of time the object has been present within the surveilled area by at least combining a first period of time that the object spends in the portion of the surveillance area captured by the first video camera and a second period of time that the object spends in the portion of the surveillance area captured by the second video camera;
generate and transmit a first alert for each identified object that has been present within the surveilled area for a period of time that exceeds a predetermined time threshold associated with the object type for the identified object, wherein a separate predetermined time threshold is established for each object type;
determine if the object is a dangerous object based on at least image matching of the object with a weapon image from the image database; and
generate and transmit a second alert for each identified dangerous object, wherein the second alert includes at least information identifying a type of dangerous object identified, identifying the time at which the dangerous object entered the surveillance area, and identifying a location within the surveillance area where the dangerous object was identified.

2. The system of claim 1, wherein at least one of the plurality of video cameras is a stereoscopic video camera.

3. The system of claim 1, wherein the object can be an animate or inanimate object.

4. The system of claim 1, wherein the computer-executable instructions are also configured to preserve recorded video data of the object that has been present within the surveilled area for the period of time that exceeds the predetermined time threshold.

5. The system of claim 1, wherein tracking the identified object utilizes depth information obtained from a configuration of at least one of the plurality of video cameras.

6. The system of claim 1, wherein the computer-executable instructions are also configured to transmit an additional alert when the identified object remains present in the surveilled area for a set duration of time after the first alert is transmitted.

7. The system of claim 1, wherein during tracking of the identified object, ambiguities in captured video data from one of the plurality of video cameras are removed using depth information obtained by computing a disparity map from the video camera.

8. The system of claim 7, wherein the video camera comprises a stereoscopic video camera.

9. The system of claim 7, wherein the video camera comprises a monocular video camera.

10. A surveillance method comprising:
    capturing video data of a surveilled area from a plurality of video cameras, wherein a field of view of each of the plurality of video cameras corresponds to a portion of the surveilled area, wherein the field of view of each of the plurality of video cameras does not include all of the surveilled area, wherein a plurality of field of views of the plurality of video cameras covers an entirety of the surveilled area;
    automatically analyzing, by a computing device, the captured video data;
    automatically identifying, by the computing device, an object that enters the surveilled area and logging a time at which the object entered the surveilled area by tracking the object as the object moves out of the field of view of a first video camera and into the field of a view of a second video camera, wherein the plurality of video cameras comprises the first video camera and the second video camera;
    automatically determining, by the computing device, an object type for the object based on at least image matching in relation to an image database;
    automatically tracking, by the computing device, the identified object to determine a period of time the object has been present within the surveilled area by at least combining a first period of time that the object spends in the portion of the surveillance area captured by the first video camera and a second period of time the object spends in the portion of the surveillance area captured by the second video camera;
    automatically generating and transmitting, by the computing device, a first alert for each identified object that has been present within the surveilled area for a period of time that exceeds a predetermined time threshold;
    determining, by the computing device, if the object is a dangerous object based on at least image matching of the object with a weapon image from the image database; and
    generating and transmitting, by the computing device, a second alert for each identified dangerous object, wherein the second alert includes at least information identifying a type of dangerous object identified, identifying the time at which the dangerous object entered the surveillance area, and identifying a location within the surveillance area where the dangerous object was identified.

11. The method of claim 10, further comprising preserving recorded video data of each object that has been present within the surveilled area for the period of time that exceeds the predetermined time threshold.

12. The method of claim 10, wherein tracking the identified object utilizes depth information obtained from a configuration of at least one of the plurality of video cameras.

13. The method of claim 10, further comprising transmitting, by the computing device, an additional alert when the identified object remains present in the surveilled area for a set duration of time after the first alert is transmitted.

14. The method of claim 10, wherein during tracking of the identified object, ambiguities in captured video data from one of the plurality of video cameras are removed using depth information obtained by computing a disparity map from the video camera.

15. The method of claim 14, wherein the video camera comprises a stereoscopic video camera.

16. A non-transitory computer-readable medium comprising machine-readable instructions, wherein the instructions, when executed by at least one processor, cause a computing device to at least:
    capture video data of a surveilled area from a plurality of video cameras, wherein a field of view of each of the plurality of video cameras corresponds to a portion of the surveilled area, wherein the field of view of each of the plurality of video cameras does not include all of the surveilled area, wherein a plurality of field of views of the plurality of video cameras covers an entirety of the surveilled area;
    automatically analyze the captured video data;
    automatically identify an object that enters the surveilled area and logging a time at which the object entered the surveilled area by tracking the object as the object moves out of the field of view of a first video camera and into the field of a view of a second video camera, wherein the plurality of video cameras comprise the first video camera and the second video camera;
    automatically determine an object type for the object based on at least image matching in relation to an image database;
    automatically track the identified object to determine a period of time the object has been present within the surveilled area utilizing depth information obtained from a stereoscopic configuration of at least one of the plurality of video cameras by at least combining a first period of time that the object spends in the portion of the surveillance area captured by the first video camera and a second period of time that the object spends in the portion of the surveillance area captured by the second video camera;
    automatically generate and transmit first alert for each identified object that has been present within the surveilled area for a period of time that exceeds a predetermined time threshold;
    determining if the object is a dangerous object based on at least image matching of the object with a weapon image from the image database; and
    generating and transmitting a second alert for each identified dangerous object, wherein the second alert includes at least information identifying a type of dangerous object identified, identifying the time at which the dangerous object entered the surveillance area, and identifying a location within the surveillance area where the dangerous object was identified.

17. The non-transitory computer-readable medium of claim 16, wherein the instructions further cause the computing device to preserve recorded video data of each object that has been present within the surveilled area for a period of time that exceeds the predetermined time threshold.

18. The non-transitory computer-readable medium of claim 16, wherein the instructions further cause the computing device to transmit an additional alert when the identified object remains present in the surveilled area for a set duration of time after the first alert is transmitted.

19. The non-transitory computer-readable medium of claim 16, wherein during tracking of the identified object, ambiguities in captured video data from one of the plurality of video cameras are removed using depth information obtained by computing a disparity map from a particular configuration of the video camera.

20. The non-transitory computer-readable medium of claim 19, wherein the video camera comprises a stereoscopic video camera.

* * * * *